W. DIETRICH.

CASTING MACHINE.

APPLICATION FILED SEPT. 30, 1915.

Reissued Oct. 2, 1917.

14,371.

2 SHEETS—SHEET 1.

Witnesses.
G. A. Paulmeschmidt
Arthur B. Russell.

Inventor:
William Dietrich
By J. Prunetti Atty.

W. DIETRICH.

CASTING MACHINE.

APPLICATION FILED SEPT. 30, 1915.

Reissued Oct. 2, 1917.

14,371.

2 SHEETS—SHEET 2.

Witnesses:

G. A. Paulsenduett

Arthur B. Russell.

Inventor:

William Dietrich

By J. Francis King Atty

UNITED STATES PATENT OFFICE.

WILLIAM DIETRICH, OF CHICAGO, ILLINOIS, ASSIGNOR, BY MESNE ASSIGNMENTS, TO AUTOMATIC JUSTIFIER COMPANY, OF HAMMOND, INDIANA, A CORPORATION OF INDIANA.

CASTING-MACHINE.

14,371. Specification of Reissued Letters Patent. Reissued Oct. 2, 1917.

Original No. 1,104,728, dated July 21, 1914, Serial No. 804,778, filed December 4, 1913. Application for reissue filed September 30, 1915. Serial No. 53,453.

*To all whom it may concern:*

Be it known that I, WILLIAM DIETRICH, a citizen of the United States, residing at Chicago, in the county of Cook and State of Illinois, have invented a new and useful Casting-Machine, of which the following is a specification.

My invention relates to casting machines for casting rectangular blocks of metal in which the size of the mold for the block can be varied in size, and the objects of my improvements are first, to retain the mold in a rectangular form; second, to make two sides of the mold movable; third, to provide means for retaining the one movable side of the mold in a rectangular position to the balance of the mold while being moved; fourth, to provide sliding blocks on two opposing sides of the mold to assist in forming one movable side of the mold; fifth, to provide means for securing the different sides of the mold in proper position; sixth, to make a neat, cheap and efficient device and other features to become apparent from the description to follow.

As above mentioned my invention pertains to machines for casting rectangular blocks of metal, the blocks being used in the art of printing for securing a page of type into a chase and for any other suitable purpose. In the use of these rectangular blocks it has been found that work is greatly facilitated by forming or casting the blocks as fast as they are needed and after they have served their purpose to recast them into other blocks of different sizes as again required. This eliminates the necessity of keeping a large stock of blocks on hand and the danger of mutilating the blocks by oft handling.

To describe my invention so that others versal in the art to which it pertains can make and use the same I have illustrated it on the accompanying two sheets of drawings forming a part of this specification in which:—

Similar reference characters refer to similar parts throughout the several views.

Figure 3:
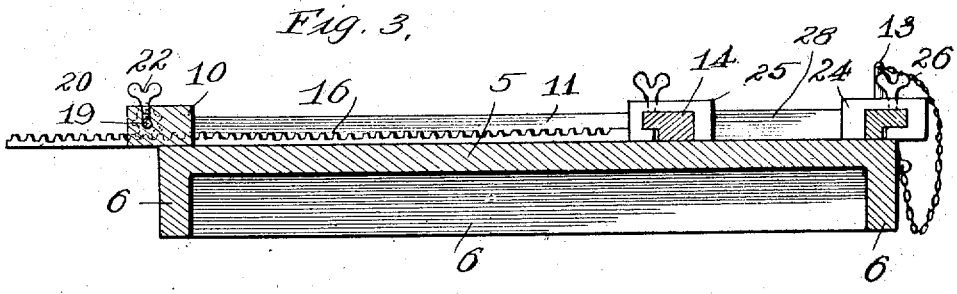
Fig. 3 is a cross sectional view taken on line 3—3 of Fig. 1.

The mechanism is all mounted on a horizontal metal table 5 of sufficient thickness and which preferably has the depending reinforcing flange 6 at its four edges. The table 5 is rectangular in shape and of any desirable size. Secured rigidly to the top of the table 5, by means of screws 7 or otherwise, are the three metal bars 8, 9 and 10, to form three sides or walls of a rectangle, which rest upon the table 5, as clearly shown in Fig. 3. The bar 8 being located at the front edge of the table 5, the bar 9 being located at the left hand end of the table 5 and the bar 10 being located at the rear edge of the table 5. At the right hand edge of the table 5 is provided a bar 11 forming the fourth side of the rectangle formed by the bars 8, 9, 10 and 11, which is pivotally secured to the rear edge of the table 5 at 12 to swing in a horizontal plane. The free end of the bar 11 is detachably secured in position against the right hand end of bar 8 by a pin 13 fitting snugly into a hole provided therefor in the bar 11 and fits snugly to the table 5 and against the end of bar 8 so that molten metal cannot escape past the same.

Figure 4:
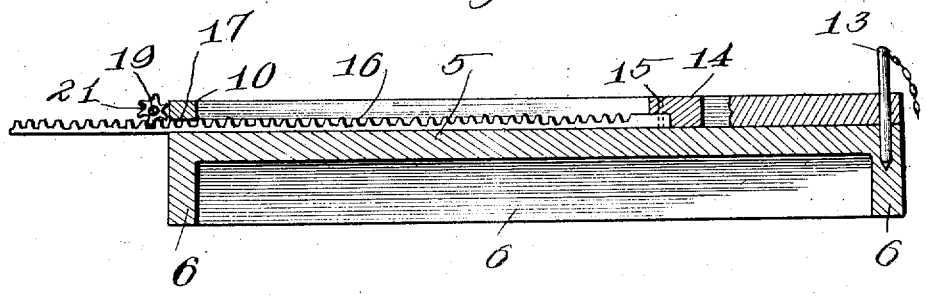
Fig. 4 is a cross sectional view taken on line 4—4 of Fig. 1.

A bar 14 is mounted to slide freely laterally forward and back on the table 5 and has attached to each end by means of a screw or pin, 15, a rackbar 16, which rackbars extend rearwardly from the bar 14 along beside the bars 9 and 11, through guide-ways 17 provided therefor in the under side of the bar 10 as seen in Fig. 4.

The bar 14 is of such length as to fit between the bars 9 and 11, and lies parallel to the bar 8, and as said bar 14 is moved toward and away from the bar 8 it is retained parallel to the bar 8. The bars 14, 11 and 8 form three sides of the mold into which the molten metal is poured, therefore the bar 14 also fits snugly to the table 5 and against the side of the bar 11. The bar 14 is moved as desired toward and away from the bar 8, by manipulating the hand wheel 18 which is rigidly secured to the shaft 19 mounted in bearings 20 integral with or mounted on the bar 10. Rigidly mounted on the shaft 19 are the two small gears 21 which are in constant mesh with the rack bars 16 so that as the shaft 19 is rotated the gears 21 will move the rack bars 16 in unison, which of course will also move the bar 14. To secure the bar 14 in any desired position a set screw 22 is provided in one of the bearings 20 to take against the shaft 19. It is obvious that preventing the shaft 19 from rotating will hold the bar 14 against movement.

The edge of the bar 11 adjacent the bar 14, is graduated at 23, to enable setting the bar 14 at the required distance from the bar 8 which determines the width of the block to be cast.

To determine the length of the block to be cast a pair of adjustable guides are slidably mounted on the bars 8 and 14, the guide 24 is mounted on bar 8 and the guide 25 is mounted on bar 14, and each is constructed like the other with a set screw 26 for securing it in any desired position on its cooperating bar. Each bar 8 and 14 is provided with graduations on one edge at 27 with which the guides 24 and 25 coöperate. The said graduations are placed exactly the same distances from the bar 11 so that if a rule or other metal piece is laid against the two guides 24 and 25 when they are set at corresponding figures, said rule or other metal piece will be parallel to the bar 11 as indicated at 28. The rule 28 forms the fourth side of the mold into which the molten metal is poured, and the distance between the rule 28 or rather the nearest side of the guides 24 and 25 and the rule 11 determines the length of the block to be cast.

Figure 1:
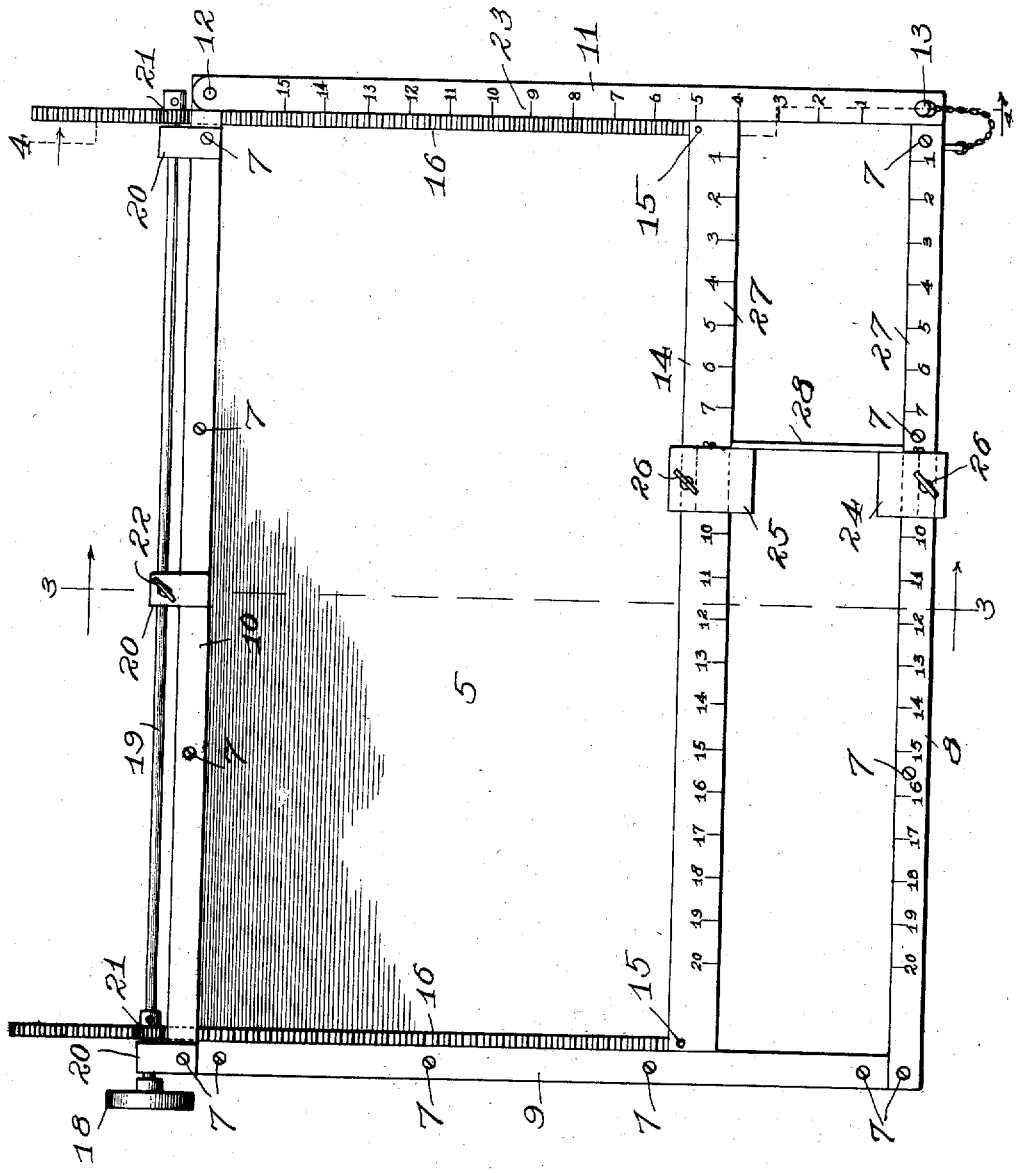
Figure 1 is a plan view of a machine embodying my invention.
Figure 2:
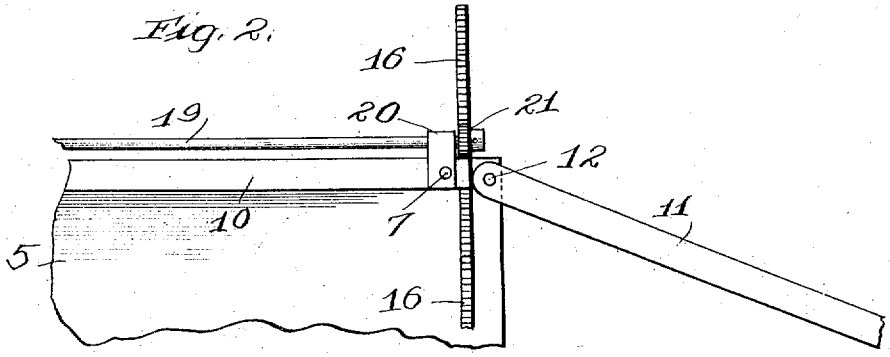
Fig. 2 is a fragmentary plan view showing one side of the mold moved to an open position.

In operation to cast or justify a block of metal of certain dimensions in two directions, the bar 14 is set at the figure on the graduations 23 to correspond to the width of the desired block, and the gages 24 and 25 are set at the figure on the graduations 27 to correspond to the length of the desired block. Care is taken that the free end of the bar 11 is secured in position against the end of the bar 8 by pin 13. A rule 28 of proper length is placed against the two guides 24 and 25; then the molten metal is poured onto the table 5 within the confines of the rule 28 and bars 8, 11 and 14. After the metal has sufficiently hardened, the pin 13 is withdrawn and the free end of the bar 11 is swung to the right about the pivot 12, as shown in Fig. 2 and the block of metal is pushed out of the mold to the right. After the cast block is thus removed from the mold the free end of bar 11 is again returned to its position against the end of bar 8, and the machine is in position for casting another block of the same dimensions. The pin 13 is preferably prevented from becoming detached from the table 5 by means of a small chain or cord.

I claim:

1. In a device of the class described, a table, bars disposed on the top of said table to form a rectangular frame or mold, one of said bars being movable toward and from the opposite bar, and guide blocks movably arranged on two of said bars, said bars having corresponding graduation marks thereon.

2. In a casting machine, a table, bars disposed on the top of said table to form a rectangular frame thereon, a longitudinally extending movable member lying midway between said bars, means for actuating said movable member, guide blocks mounted on said movable member and its corresponding parallel bar, a removable rule abutting the guide blocks to form one of the end walls of the mold or casting compartment of the machine.

3. In a casting machine, a table, bars arranged thereon to form a rectangular frame on said table, one of said bars being stationary and the opposite bar being movable toward and from the same, means for moving said movable bar to determine the dimensions upon two sides of the rectangle, and guide blocks on two of said bars adapted to be adjusted to the proper position to determine the dimensions upon the opposite sides of the rectangular frame.

4. In a casting machine, a table, bars arranged thereon to form a rectangular frame on said table, one of said bars being movable toward and from the opposite bar, guide blocks movable longitudinally of two of said bars, rack bars connected with the ends of said movable bar, each of said bars being provided with corresponding graduation marks on the upper face thereof.

5. In a casting machine, a table, bars arranged upon said table to form a rectangular frame, one of said bars being stationary and the opposite bar being movable from and toward the same, guide blocks carried upon the aforesaid movable and stationary bars and adapted to be arranged in different adjusted positions, a removable member abutting said guide blocks to form one end of the mold compartment, and graduations on the different bars to permit the bars to be accurately adjusted in either direction.

6. In a casting machine, a table, bars arranged upon said table to form a rectangular frame, a bar movable laterally inside of said rectangular frame, rack bars secured to said movable bar, actuating mechanism including gears meshing with said rack bars for actuating the movable bar, a guide block mounted upon said movable bar and a corresponding guide block mounted upon one side of the rectangular frame, said guide blocks adapted to be adjusted longitudinally on their respective bars.

7. In a casting machine, a table, two parallel bars resting on the top of said table, one of the aforesaid bars being stationary and the other movable from and toward the same, mechanism for actuating the aforesaid movable bar, and a third bar mounted in proximity to corresponding ends of the other two bars adapted to be moved in a horizontal plane, leaving the end of the table unobstructed for a portion of its length at the ends of the other two bars, and adjustable guides on the aforesaid parallel bars for determining the length of the block to be cast.

8. In a casting machine, a table, two parallel bars on said table, one of the aforesaid bars being stationary and the other movable from and toward the same, mechanism for actuating said movable bar, a third bar extending at right angles to the corresponding ends of the other two bars, said third bar being pivoted at one end thereof to the table and adapted to be moved in a horizontal plane, adjustable guide blocks mounted upon the aforesaid parallel bars and a removable piece abutting said guide blocks to form the fourth side of the mold or frame formed by the aforesaid bars.

9. In a casting machine, a table, a mold formed of two parallel bars arranged on said table, one of said bars being stationary and the other being movable from and toward the same, graduations on said bars, a third bar extending at right angles to and abutting the corresponding ends of the parallel bars, guide blocks adjustably mounted on said parallel bars to form the compartment of the mold, a removable piece abutting against said guide block to form the fourth wall of the mold, and means including gears and rack bars operating with said movable bar to carry it toward and from the stationary bar.

10. In a machine for casting rectangular blocks of metal, comprising a table, a stationary bar arranged at the front edge of the table and extending above the surface of the table, a bar movable laterally across said table from and toward the stationary bar, guide blocks adjustably mounted on said bars, means for engaging said movable bar at two separate points for positively moving it from and toward the stationary bar and maintaining it at all times parallel therewith, and bars at opposite ends of the aforesaid stationary and movable bars to form a rectangular frame.

11. In a machine for casting rectangular blocks of metal, a table, two bars extending parallel to each other on said table, one of which is stationary, the other movable, a third bar mounted on the table and movable from a position above the table at right angles to the movable bar, to a position away from the top of the table to provide a doorway through which the block may be removed, guide blocks adjustably mounted upon the parallel bars and a removable piece abutting said blocks to form the fourth wall of the mold.

12. In a machine for casting rectangular blocks of metal, a table, two parallel bars on said table, one of which is fixedly secured thereto and one of which is movable thereon, a third bar arranged at right angles to corresponding ends of said parallel bars, said third bar being pivotally secured at one end thereof to the table and adapted to be swung in a horizontal plane away from the movable bar to permit the cast block to be removed, guide blocks adjustably mounted on the parallel bars, and a removable piece abutting said guide blocks to form the fourth wall of the mold, and actuating means connected with the first mentioned movable bar adapted to move the same toward and from the stationary bar to maintain said bar always parallel with the stationary bar opposite thereto.

13. In a machine for casting rectangular blocks of metal, a table, a stationary bar on said table, a second bar on the table movable laterally toward and from the stationary bar, actuating mechanism for the movable bar arranged to move opposite ends of the movable bar simultaneously in the same direction and to the same extent so as always to maintain the two bars in parallelism with each other, each of said bars provided with graduations distributed lengthwise thereof, adjustable blocks movable lengthwise of said bars, and a removable piece abutting said blocks to form one lateral wall of the mold, a bar extending at right angles to corresponding ends of the parallel bars, said last named bar being pivoted at one end thereof to the table and adapted to swing in a horizontal plane to provide an opening for removing the cast block from the mold.

14. In a machine for casting blocks of metal, a table, two parallel bars mounted on said table, one of said bars being stationary, the other movable, a third bar extending at right angles to corresponding ends of said parallel bars, blocks adjustably mounted on said parallel bars, and a removable piece abutting said blocks to form the fourth side of a mold of the desired length and width to receive the molten metal therein to form the block.

15. In a device of the class described, a suitable table, a suitable bar rigidly secured on the table at the front edge, a second bar secured rigidly on the table at the left hand edge extending from the first named bar to the rear of the table, a third bar secured on the table at the right hand edge extending from the first named bar to the rear of the table, a fourth bar slidably mounted on said table parallel to the first named bar and extending from said second named bar at the left to said third named bar at the right and means for moving said fourth named bar laterally toward and away from said first named bar comprising two rack bars connected to said fourth named bar and two gears meshing with said rack bars mounted rigidly on a common shaft.

16. In a device of the class described, a suitable table, a bar rigidly secured to the table at the front edge, a second bar rigidly secured to the table at the left hand edge extending from said first named bar to the rear of the table, a third bar secured to the table at the right hand edge extending from said first named bar to the rear of the table and mounted to swing on a pivot at one end, a fourth bar slidably mounted on said table parallel to said first named bar and extending from said second named bar to said third named bar, a rack bar connected at either end of said fourth named bar and extending laterally therefrom to the rear edge of the table, a shaft at the rear edge of the table, gears rigidly mounted on said shaft in constant mesh with said rack bars, means for rotating the said shaft and means for locking the shaft against rotation.

17. In a device of the class described, a suitable table, a bar rigidly mounted on said table at the front edge, a second bar rigidly mounted on said table at the left hand edge and extending from said first named bar to the rear edge of the table, a third bar pivotally mounted on said table with means for locking it at the right hand edge of said table extending from said first named bar to the rear edge of the table, a fourth bar movably mounted on said table parallel to said first named bar and extending from said second named bar to said third named bar, means for moving said fourth named bar laterally toward and away from said first named bar comprising two rack bars connected to said fourth named bar and a shaft carrying two gears in constant mesh with said two rack bars, a guide block slidably mounted on said first named bar and a guide block slidably mounted on said fourth named bar.

18. In a device of the class described, a suitable table, a bar rigidly mounted on said table at the front edge, a second bar rigidly mounted on said table at the left hand edge and extending from said first named bar to the rear edge of the table, a third bar mounted on the table at the right hand edge extending from said first named bar to the rear edge of the table, a fourth bar slidably mounted on said table parallel to the first named bar and extending from said second named bar at the left to said third named bar at the right, means for moving said fourth named bar laterally toward and away from said first named bar and a guide block slidably mounted on said first named bar.

In testimony whereof I have signed my name in the presence of two subscribing witnesses.

WILLIAM DIETRICH.

Witnesses:
VIVIAN REESER,
ARTHUR B. RUSSELL.

Copies of this patent may be obtained for five cents each, by addressing the "Commissioner of Patents, Washington, D. C."